Jan. 9, 1923.
J. W. CATO.
TIRE TUBE.
FILED MAY 15, 1922.
1,441,965.
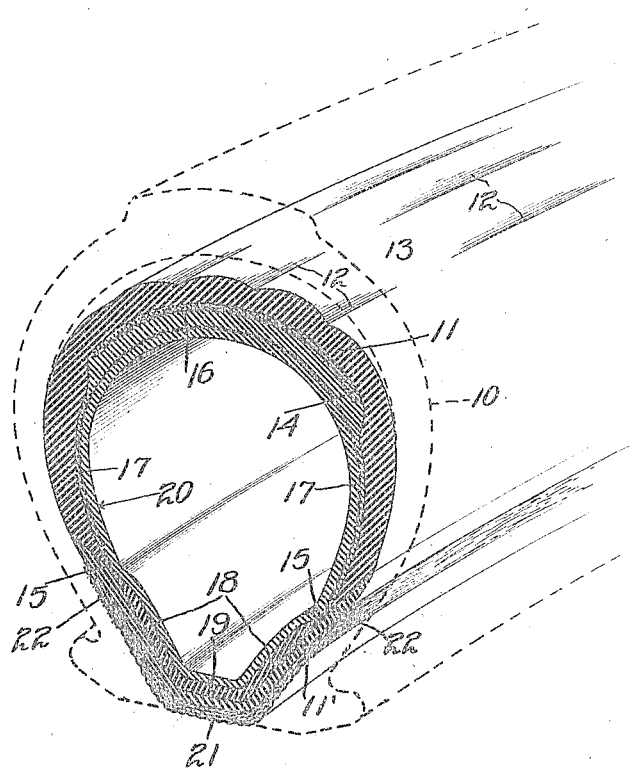
Inventor
James W. Cato
By [signature]
Attorney Patented Jan. 9, 1923.

1,441,965

UNITED STATES PATENT OFFICE.

JAMES W. CATO, OF ANNISTON, ALABAMA.

TIRE TUBE.

Application filed May 15, 1922. Serial No. 561,051.

*To all whom it may concern:*

Be it known that I, JAMES W. CATO, a citizen of the United States, residing at Anniston, in the county of Calhoun and State of Alabama, have invented certain new and useful Improvements in Tire Tubes, of which the following is a specification.

My said invention relates to an inner tube for pneumatic tires of vehicles and it is an object of the same to provide an inner tube which shall be unusually strong and resistant to wear.

A further object is to provide means in a tube of the character described to prevent pinching of the inner tube.

Still another object is to prevent rust on the rim from coming in contact with the rubber of the inner tube.

Referring to the accompanying drawing which is made a part hereof and on which similar reference characters indicate similar parts, The single figure is a sectional perspective of a portion of an inner tube and an outer shoe, the inner tube being shown in deflated condition.

Referring to the drawing reference character 10 indicates an outer casing which may be of any desirable or conventional form and is here shown in the form of an open-bellied clincher tire of ordinary construction. Within the outer casing I have shown an inner casing or tube having an outer layer of relatively hard rubber comprising a tread-side segment 11 and a rim-side segment 11', this casing having circumferentially extending grooves at 12—12, which grooves are interrupted at intervals of two or three inches by unbroken circumferential portions of the tire as indicated at 13. Within the rubber layer 11 is a second layer of softer rubber 14 which is thickest in the region of the tread and extends down approximately to the point indicated at 15. A breaker strip 16 of coarse threads coarsely woven lies between the layers 11 and 14 and serves the usual purpose of a breaker strip in addition to which it serves to unite the layers 10 and 14 firmly.

Within the rubber layer 14 is a layer of fabric 17 extending nearly around the tire and preferably approximately to the point indicated at 18. Overlapping the ends of this fabric layer and extending across the gap between them is a relatively thick layer of rather soft rubber 19, and the inner surface of the tube is made up of a layer of rubber 20 completely covering such surface. At the rim side of the tire there is a reenforcement 21 comprising preferably about four plies of fabric at the thickest part and tapering down to a single ply at the outer edge. The tire is completed by application of a narrow strip of smooth fabric 22 at the outer edges of the strip 21.

It will be evident from the drawing that when the tube is deflated it fits loosely within the outer shoe, the greater part of the vacant space being at the tread side. When the tube is inflated the rubber will yield until the tube fits closely in the outer casing and the yielding action will occur mainly at the rim side of the tire where that part of the segment 11' lying between the fabric portions 17 and 22 will stretch laterally as will also the parts of layers 19 and 20 lying between the opposed edges of the fabric layer 17 and adjacent thereto. The longitudinal corrugations formed in the outer surface by the interrupted grooves 12 thereof serve to prevent overheating of the tire as they cause a pumping action to take place on the air between the inner tire and the outer shoe and thus provide a circulation of air. I have found also that tires so constituted are less liable to be punctured than ordinary tubes. The occurrence at the tread side of the tube of a breaker strip and a fabric strip closely adjacent thereto gives the tube great strength and also aids in preventing punctures.

In manufacturing this tube I wind the various elements on a mandrel. The inner layer lies nearest to the mandrel, after which comes the annulus 19. The fabric layer is then laid on, its edges remaining free. Layer 14 is placed on the fabric, after which the breaker strip is added, and this is followed by segmental layer 11. The segmental layer 11' follows at the rim side and binds down the edges of the fabric and the layer 11, and this segment is followed by fabric strips 21 and 22, after which the ends are joined and the whole may be finished in the usual manner.

Having thus fully described my said invention, what I claim as new and desire to secure by Letters Patents, is:

1. An inner tube comprising a plurality of layers at the tread side, a breaker strip within the outermost layer, and a fabric strip separated therefrom by an intermediate layer of rubber, said fabric strip extending nearly around the tube and having its inner edges spaced adjacent the rim side of the tube, substantially as set forth.

2. A tire tube comprising a plurality of layers of rubber, a layer of fabric extending nearly around the tube and having its edges spaced at the rim side, a fabric reenforcement at the rim side overlapping the edges of the first-named fabric strip, and narrow strips of smooth fabric covering the edges of the last named fabric re-enforcement, substantially as set forth.

3. An inner tube for pneumatic tires having sets of laterally spaced external grooves to accommodate a quantity of air for circulation between the tube and tire, said sets being spaced in the circumferential direction by uninterrupted portions of the periphery, substantially as set forth.

4. An inner tube for pneumatic tires comprising a plurality of layers of rubber, a breaker strip interposed between the two outermost layers, a fabric strip between two other layers of rubber, an inner re-enforcing annulus of rubber overlapping the edges of said fabric strip, an outer re-enforcing annulus of fabric overlapping the edges of said fabric strip, and the outer layer of rubber having depressions in its periphery spaced laterally and circumferentially thereof, substantially as set forth.

In witness whereof, I have hereunto set my hand and seal at Washington, District of Columbia, this 9th day of May, A. D. nineteen hundred and twenty-two.

JAMES W. CATO. [L. S.]

Witnesses:
FRANK W. DAHN,
E. K. REICHENBACH.